(12) United States Patent
Yasuda

(10) Patent No.: US 10,225,482 B2
(45) Date of Patent: Mar. 5, 2019

(54) METHOD OF CONTROLLING PHOTOGRAPHING DEVICE INCLUDING FLASH, AND THE PHOTOGRAPHING DEVICE

(71) Applicant: Samsung Electronics Co., Ltd, Suwon-si (KR)

(72) Inventor: Tomonaga Yasuda, Seoul (KR)

(*) Notice: Subject to any disclaimer, the term of this patent is extended or adjusted under 35 U.S.C. 154(b) by 36 days.

(21) Appl. No.: 15/374,731

(22) Filed: Dec. 9, 2016

(65) Prior Publication Data

US 2017/0171447 A1 Jun. 15, 2017

(30) Foreign Application Priority Data

Dec. 11, 2015 (KR) .................... 10-2015-0177372

(51) Int. Cl.
*H04N 5/235* (2006.01)
*H04N 5/225* (2006.01)
*H04N 5/232* (2006.01)

(52) U.S. Cl.
CPC ......... *H04N 5/2352* (2013.01); *H04N 5/2256* (2013.01); *H04N 5/2351* (2013.01); *H04N 5/2354* (2013.01); *H04N 5/23293* (2013.01)

(58) Field of Classification Search
CPC .................................................. H04N 5/2352
See application file for complete search history.

(56) References Cited

U.S. PATENT DOCUMENTS

| | | | |
|---|---|---|---|
| 9,294,684 B2 | 3/2016 | Shimada et al. | |
| 9,442,154 B2 * | 9/2016 | Ohtsuka | G01N 21/67 |
| 2005/0140822 A1 * | 6/2005 | Ichikawa | H04N 5/2351 348/370 |
| 2009/0040332 A1 * | 2/2009 | Yoshino | H04N 5/23293 348/222.1 |
| 2010/0073551 A1 * | 3/2010 | Honjo | G03B 17/14 348/349 |
| 2011/0187920 A1 * | 8/2011 | Shimada | H04N 5/222 348/371 |
| 2012/0177352 A1 * | 7/2012 | Pillman | H04N 5/23248 396/61 |
| 2012/0194732 A1 * | 8/2012 | Masuda | H04N 5/2256 348/371 |
| 2013/0335583 A1 * | 12/2013 | Murakita | H04N 5/2256 348/207.1 |

FOREIGN PATENT DOCUMENTS

| | | |
|---|---|---|
| JP | 5541938 B2 | 7/2014 |
| JP | 5625370 B2 | 11/2014 |
| JP | 5683842 B2 | 3/2015 |

\* cited by examiner

*Primary Examiner* — Cynthia Segura

(57) ABSTRACT

Provided are a method and an apparatus for controlling an electronic device including a flash. The method includes obtaining light emission waveform data including light emission times and light emission intensities of the flash corresponding to a plurality of pre-set guide numbers. Also, calculating a waveform area of the light emission waveform data and calculating light emission amounts regarding the respective guide numbers by using the waveform area. The method further includes calculating a main guide number corresponding to light emission amount that satisfies necessary light emission amounts obtained when the flash pre-flashes from among the respective light emission amounts and controlling the flash to emit light according to a light emission time and light emission intensity based on the calculated main guide number.

17 Claims, 19 Drawing Sheets

FIG. 5

| GV16 | original GN (SS > 1/250) | GN at SS:1/12000 | GN at SS:1/14000 | GN at SS:1/16000 | GN at SS:1/18000 | GN at SS:1/20000 |
|---|---|---|---|---|---|---|
| 28 | 1.83 | 1.83 | 1.83 | 1.83 | 1.82 | 1.80 |
| ... | ... | ... | ... | ... | ... | ... |
| 100 | 8.72 | 6.73 | 6.17 | 5.66 | 5.19 | 4.86 |
| 101 | 8.92 | 6.87 | 6.30 | 5.66 | 5.30 | 4.86 |
| 102 | 9.11 | 6.87 | 6.30 | 5.78 | 5.30 | 4.86 |
| 103 | 9.31 | 7.03 | 6.44 | 5.91 | 5.42 | 4.97 |
| 104 | 9.51 | 7.18 | 6.44 | 5.91 | 5.42 | 4.97 |
| 105 | 9.72 | 7.18 | 6.58 | 6.04 | 5.54 | 5.08 |
| 106 | 9.93 | 7.34 | 6.73 | 6.04 | 5.54 | 5.08 |
| 107 | 10.15 | 7.50 | 6.73 | 6.17 | 5.66 | 5.19 |
| 108 | 10.37 | 7.50 | 6.87 | 6.17 | 5.66 | 5.19 |
| 109 | 10.60 | 7.66 | 6.87 | 6.30 | 5.78 | 5.30 |
| 110 | 10.83 | 7.83 | 7.03 | 6.30 | 5.78 | 5.30 |
| ... | ... | ... | ... | ... | ... | ... |
| 187 | 57.43 | 11.07 | 10.15 | 8.54 | 7.34 | 6.58 |

FIG. 6

| | GV | t0 | t1 | t2 | t3 | t4 | t5 | t6 | ht0 | ht1 | ht2 | ht3 | ht4 | ht5 | ht6 |
|---|---|---|---|---|---|---|---|---|---|---|---|---|---|---|---|
| w0 | 28 | 0 | 900 | 1200 | 1230 | 1260 | 1330 | 1460 | 0 | 0 | 316.8 | 352 | 316.8 | 176 | 0 |
| w1 | 110 | 0 | 900 | 1670 | 2020 | 2070 | 2160 | 2320 | 0 | 0 | 810 | 900 | 810 | 450 | 0 |
| w2 | 132 | 0 | 900 | 1970 | 3270 | 3270 | 3270 | 3270 | 0 | 0 | 900 | 1000 | 900 | 500 | 0 |
| w3 | 155 | 0 | 900 | 1970 | 3270 | 6160 | 6160 | 6160 | 0 | 0 | 900 | 1000 | 900 | 500 | 0 |
| w4 | 177 | 0 | 900 | 1970 | 3270 | 6160 | 22800 | 22800 | 0 | 0 | 900 | 1000 | 900 | 500 | 0 |
| w5 | 187 | 0 | 900 | 1970 | 3270 | 6160 | 22800 | 58900 | 0 | 0 | 900 | 1000 | 900 | 500 | 0 | ively

METHOD OF CONTROLLING PHOTOGRAPHING DEVICE INCLUDING FLASH, AND THE PHOTOGRAPHING DEVICE

CROSS-REFERENCE TO RELATED APPLICATION(S) AND CLAIM OF PRIORITY

The present application is related to and claims the benefit of Korean Patent Application No. 10-2015-0177372, filed on Dec. 11, 2015, in the Korean Intellectual Property Office, the disclosure of which is incorporated herein in its entirety by reference.

TECHNICAL FIELD

The present disclosure relates to a method of controlling a photographing device including a flash, and the photographing device.

BACKGROUND

Types of camera shutters include a focal plane shutter and a global shutter. The focal plane shutter uses two slits, and thus a stain may be formed based on the location of an exposure surface according to slit driving. On the other hand, the global shutter uses an image sensor used for exposure as a shutter instead of a mechanical shutter. In other words, exposure may be started and ended by controlling an image sensor. The global shutter may start exposure of the entire image sensor simultaneously. Furthermore, the global shutter may simultaneously end exposure of the entire image sensor. However, due to a fast shutter speed and a short exposure time of the global shutter, a light emission starting timing of a flash may not match an exposure starting timing. Therefore, it is necessary to control the light emission amount of the flash.

SUMMARY

To address the above-discussed deficiencies, it is a primary object to provide embodiments of a method of controlling an electronic device including a flash and a photographing device, according to the present disclosure.

An embodiment may provide a non-transitory computer-readable recording medium having recorded thereon a computer program for implementing the method.

Additional embodiments will be set forth in part in the description which follows and, in part, will be apparent from the description, or may be learned by practice of the presented embodiments.

According to an embodiment, a method of controlling an electronic device having a photographing device and including a flash includes obtaining light emission waveform data including light emission times and light emission intensities of the flash corresponding to a plurality of pre-set guide numbers. The method further includes calculating a waveform area of the light emission waveform data and calculating light emission amounts regarding the respective guide numbers by using the waveform area. Additionally, the method also includes calculating a main guide number corresponding to a light emission amount, from among the respective light emission amounts, that satisfies a necessary light emission amount obtained when the flash pre-flashes. Further, the method includes controlling the flash to emit light according to a light emission time and light emission intensity corresponding to the calculated main guide number.

The calculating of the light emission amount may also include, by using differences between the light emission waveform data corresponding to the plurality of guide numbers, calculating light emission waveform data corresponding to guide numbers other than the plurality of guide numbers. Also, the calculating light emission amounts corresponding to various other guide numbers different than the plurality of guide numbers, the calculating of the light emission amounts determined by using the waveform areas of the light emission waveform data.

The obtaining of the light emission waveform data may include determining whether an external flash is connected; and, when it is determined that the external flash is connected, obtaining light emission waveform data including light emission times and light emission intensities of the flash corresponding to a plurality of pre-set guide numbers from the external flash.

The controlling of the flash may include controlling the external flash to emit light according to a light emission time and light emission intensity corresponding to the calculated main guide number.

The method may further include calculating a shutter speed and an aperture; and calculating an exposure time by using the calculated shutter speed and the calculated aperture.

The calculating of the main guide number may include, when the exposure time is shorter than a light emission time corresponding to the calculated main guide number, calculating light emission amount corresponding to the exposure time; and re-calculating a main guide number corresponding to the calculated exposure time, wherein the flash may be controlled to emit light according to a light emission time and light emission intensity corresponding to the re-calculated main guide number.

The method may further include, when the calculated exposure time is shorter than the light emission time of the flash, reducing a shutter speed.

The method may further include determining a charging ratio of the flash, wherein, in the obtaining of the light emission waveform data, different light emission waveform data may be obtained according to the charging ratios of the flash, and, in the calculating of the light emission amount, an area of the light emission waveform data may be calculated by using differences between light emission waveform data that differ according to the determined charging ratio of the flash and the determined charging ratio of the flash.

The method may further include displaying the calculated guide number, a flash distance based on a light emission corresponding to the calculated guide number, and light emission amount corresponding to the calculated guide number.

According to an aspect of another embodiment, a photographing device including a flash includes the flash; a flash emission controller configured to control a light emission time and light emission intensities of the flash; and a controller configured to control the flash emission controller, wherein the controller obtains light emission waveform data including light emission times and light emission intensities of the flash corresponding to a plurality of pre-set guide numbers, calculates a waveform area of the light emission waveform data, calculates light emission amounts regarding the respective guide numbers by using the waveform area, calculates a main guide number corresponding to light emission amount that satisfies necessary light emission amount obtained when the flash pre-flashes from among the respective light emission amounts, and provides the calculated main guide number to the flash emission controller.

The controller may, by using differences between the light emission waveform data corresponding to the plurality of guide numbers, calculate light emission waveform data corresponding to guide numbers other than the plurality of guide numbers and calculate light emission amounts corresponding to the guide numbers other than the plurality of guide numbers by using the waveform areas of the light emission waveform data.

The controller may determine whether an external flash is connected and, when it is determined that the external flash is connected, the controller may obtain light emission waveform data including light emission times and light emission intensities of the flash corresponding to a plurality of pre-set guide numbers from the external flash.

The controller may control the external flash to emit light according to a light emission time and light emission intensity corresponding to the calculated main guide number.

The controller may calculate a shutter speed and an aperture and calculate an exposure time by using the calculated shutter speed and the calculated aperture.

When the exposure time is shorter than a light emission time corresponding to the calculated main guide number, the controller may calculate light emission amount corresponding to the exposure time and re-calculate a main guide number corresponding to the calculated exposure time, and the flash emission controller may control the flash to emit light according to a light emission time and light emission intensity corresponding to the re-calculated main guide number.

When the calculated exposure time is shorter than the light emission time of the flash, the controller may reduce a shutter speed.

The photographing device may further include a charging controller that determines a charging ratio of the flash, wherein the controller may obtain different light emission waveform data according to the charging ratios of the flash and calculate an area of the light emission waveform data by using differences between light emission waveform data that differ according to the determined charging ratio of the flash and the determined charging ratio of the flash.

The photographing device may further include a display that displays the calculated guide number, a flash distance based on a light emission corresponding to the calculated guide number, and light emission amount corresponding to the calculated guide number.

Before undertaking the DETAILED DESCRIPTION below, it may be advantageous to set forth definitions of certain words and phrases used throughout this patent document: the terms "include" and "comprise," as well as derivatives thereof mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 is a table for illustrating a guide number;

FIG. 6 is a table illustrating a method of controlling an electronic device including a photographing device and a flash, according to an embodiment;

DETAILED DESCRIPTION

Figure 1:
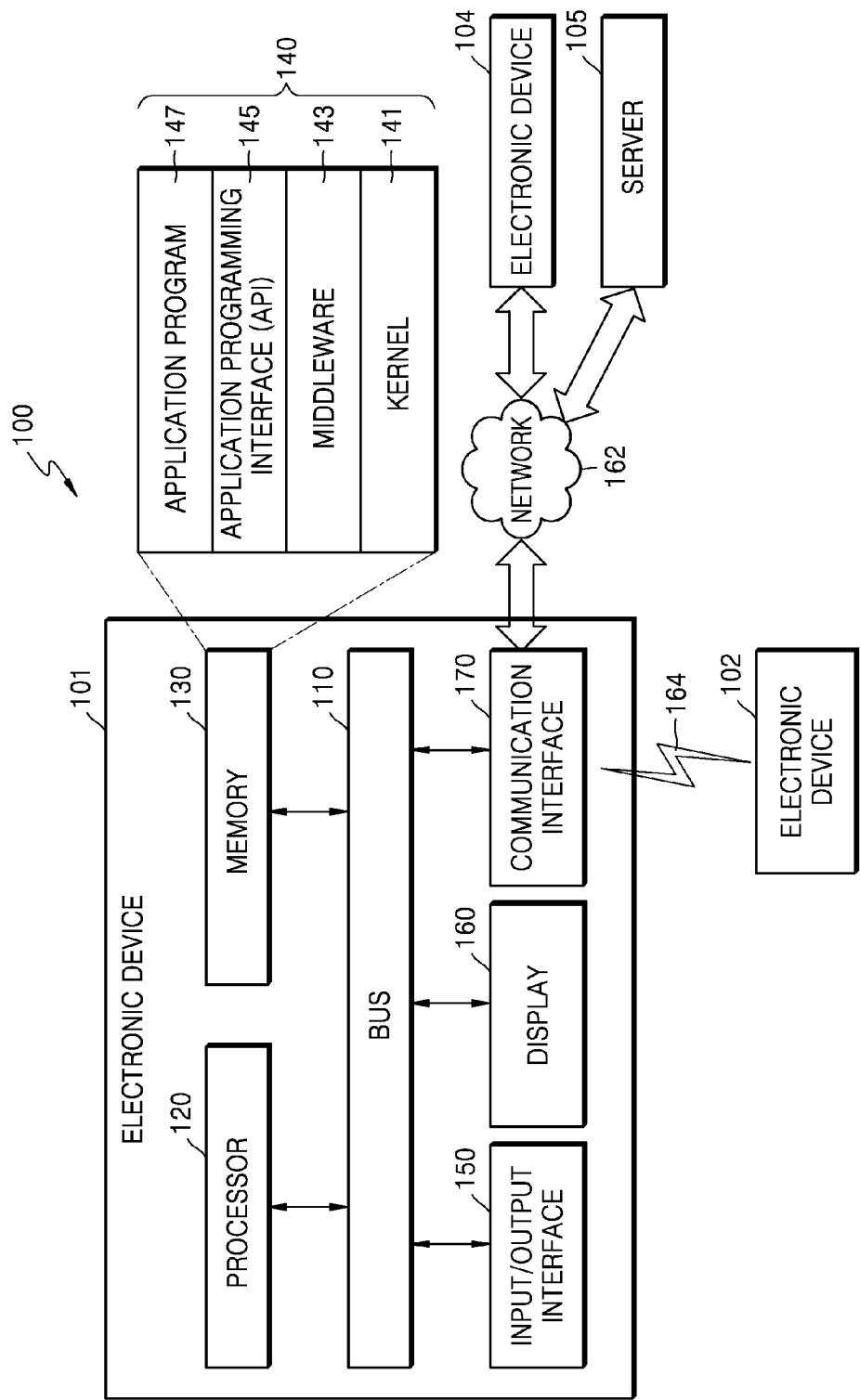
FIG. 1 illustrates a block diagram of an electronic device operating in a network environment, according to an embodiment.

FIGS. 1 through 18B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Reference will now be made in detail to embodiments, examples of which are illustrated in the accompanying drawings. In this regard, the present embodiments may have different forms and should not be construed as being limited to the descriptions set forth herein. Rather, these embodiments are provided so that this disclosure will be thorough and complete and will fully convey the concept of the invention to those skilled in the art, and the present disclosure will only be defined by the appended claims.

As used herein, the term "and/or" includes any and all combinations of one or more of the associated listed items. Expressions such as "at least one of," when preceding a list of elements, modify the entire list of elements and do not modify the individual elements of the list.

Terminologies used in the present specification will be briefly described, and then the detailed description of the present disclosure will be given.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the term "units" described in the specification mean units for processing at least one function and operation and can be implemented by software components or hardware components, such as a field programmable gate array (FPGA) or an application specific integrated circuit (ASIC). However, the "units" are not limited to software components or hardware components. The "units" may be embodied on a recording medium and may be configured to operate one or more processors. Therefore, for example, the "units" may include components, such as software components, object-oriented software components, class components, and task components, processes, functions, properties, procedures, subroutines, program code segments, drivers, firmware, micro codes, circuits, data, databases, data structures, tables, arrays, and variables. Components and functions provided in the "units" may be combined to smaller numbers of components and "units" or may be further divided into larger numbers of components and "units."

The present disclosure will now be described more fully with reference to the accompanying drawings, in which embodiments of the present disclosure are shown. In the description of the present disclosure, certain detailed explanations of related art are omitted when it is deemed that they may unnecessarily obscure the essence of the present disclosure.

From among processors, there is a scalar processor that employs the Single Instruction Single Data technique for processing a single piece of data with a single instruction. Along with technical developments regarding a smart phone and a high-definition TV, a processor with highly efficient computing capability for processing large data for image processing or graphic rendering is demanded. Therefore, a vector processor that employs the Single Instruction Multiple Data technique for processing a plurality of pieces of data with a single instruction is commonly used.

Throughout the present specification, a guide number (GN) refers to a number indicating light emission amount of a flash in order to obtain a suitable exposure during a photographing operation using the flash. The greater the guide number is, the higher the light emission amount becomes.

FIG. 1 is a schematic block diagram of an electronic device under a network environment, according to an embodiment. An electronic device 101 may include a bus 110, a processor 120, a memory 130, an input/output interface 150, a display 160, and a communication interface 170. According to an embodiment, the input/output interface 150 may include a photographing device. According to an embodiment, at least one of the components of the electronic device 101 may be omitted or the electronic device 101 may further include additional components.

The bus 110 may include a circuit that interconnects the components 110 through 170 to one another and perform communication (e.g., control messages and/or data) between the components.

The processor 120 may include at least one of a central processing unit (CPU), an application processor (AP), and a communication processor (CP). For example, the processor 120 may control the bus 110, the memory 130, the input/output interface 150, the display 160, and the communication interface 170 of the electronic device 101 and/or may perform computations related to communication or data processing tasks.

The processor 120 may perform a task performed by at least one of the bus 110, the memory 130, the input/output interface 150, the display 160, and the communication interface 170.

The memory 130 may include a volatile memory and/or a non-volatile memory. The memory 130 may store instructions or data related to at least one of the other components of the electronic device 101, for example. According to an embodiment, the memory 130 may store software and/or programs 140.

The software and/or programs 140 may include a kernel 141, middleware 143, an application programming interface (API) 145, and/or an application program (or "application") 147. At least some of the kernel 141, the middleware 143, and the API 145 may be referred to as an operating system (OS).

The input/output interface 150 may function as an interface for transmitting instructions or data input by a user or from another external device to the other component(s) of the electronic device 101. For example, the input/output interface may include a photographing device for capturing pictures. Furthermore, the input/output interface 150 may transmit instructions or data received from the other component(s) of the electronic device 101 to a user or another external device.

The display 160 may include, for example, a liquid crystal display (LCD), a light-emitting diode (LED) display, an organic light-emitting diode (OLED) display, a micro-electromechanical systems (MEMS) display, or an electronic paper display. The communication interface 170 may establish communication between the electronic device 101 and an external device (e.g., a first external device 102, a second external device 104, or a server 105).

Each of the first and second external electronic devices 102 and 104 may be a device of a same type of or a different type of the electronic device 101.

Figure 2:
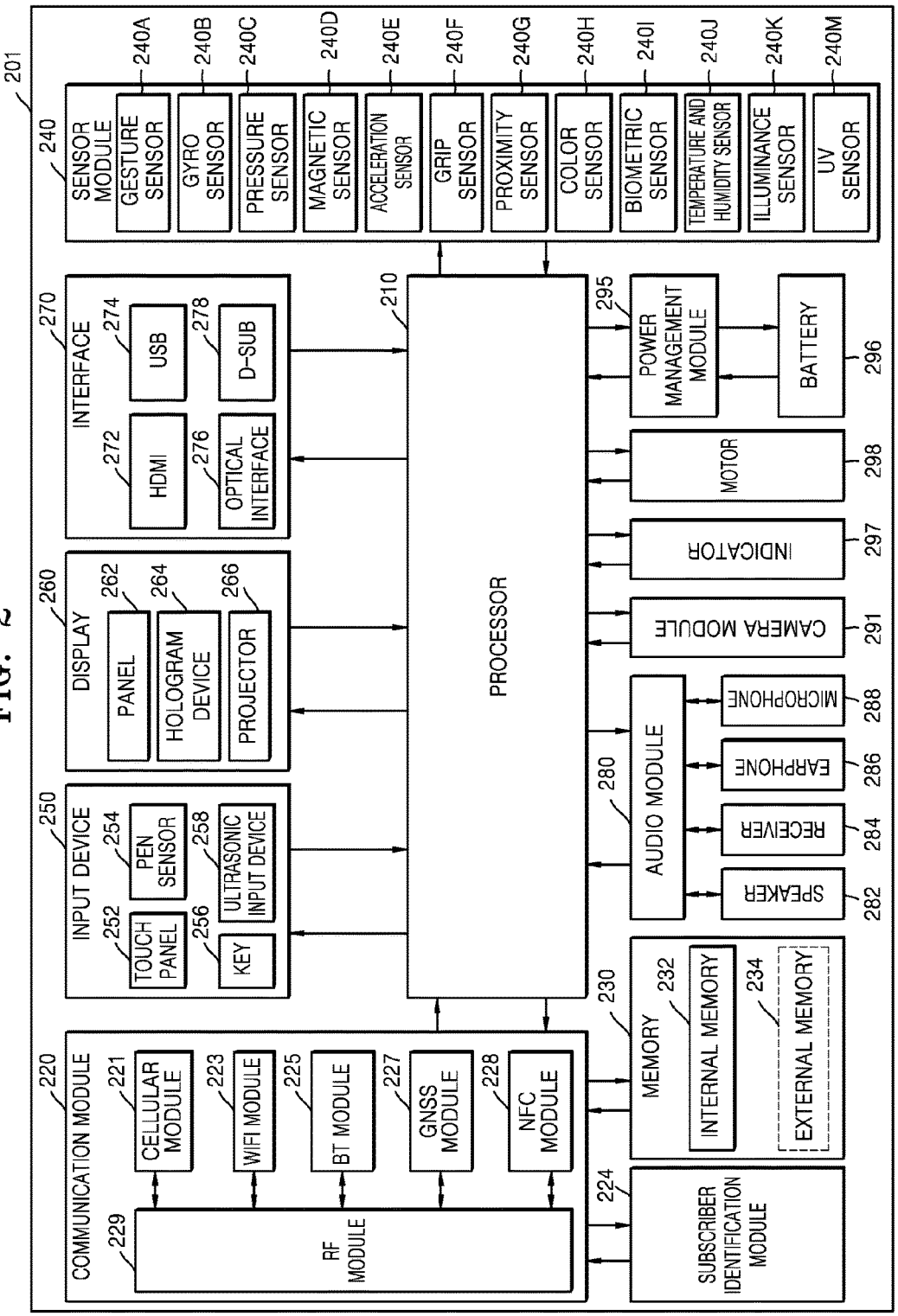
FIG. 2 is a block diagram illustrating an electronic device, according to another embodiment.

FIG. 2 is a block diagram of an electronic device 201 including a photographing device according to another embodiment. The electronic device 201 may include a portion of or the entire electronic device 101 shown in FIG. 1, for example. The electronic device 201 may include at least one processor 210 (e.g., an AP), a communication module 220, a subscriber recognizing module 224, a memory 230, a sensor module 240, an input device 250, for example, a photographic device, a display 260, an interface 270, an audio module 280, a camera module 291, a power managing module 295, a battery 296, an indicator 297, and a motor 298.

According to an embodiment, at least one of the components of the electronic device 201 may be omitted or the electronic device 201 may further include a photographing device or additional components. The processor 210 may execute an OS or an application program, thereby controlling at least one hardware or software component connected to the processor 210 and performing various data processing tasks and computations.

According to an embodiment, the at least one processor 210 may control the communication module 220, the subscriber recognizing module 224, the memory 230, the sensor module 240, the input device 250, the display 260, the interface 270, the audio module 280, the camera module 291, the power managing module 295, the battery 296, the indicator 297, and the motor 298, where the at least one processor 210 may perform a task performed by the above-stated components.

For example, the processor 210 may be embodied as a system-on-chip. According to an embodiment, the processor 210 may include at least one processor, such as an AP, and may further include a graphics processing unit (GPU) and/or an image signal processor. The processor 210 may include at least some (e.g., a cellular module 221) of the components shown in FIG. 2. The processor 210 may load an instruction or data received from at least one of the other components (e.g., a non-volatile memory) to a volatile memory and process the same and may store various data in the non-volatile memory.

The communication module 220 may have a configuration similar to or same as that of the communication interface 170 of FIG. 1.

For example, the memory 230 may include an internal memory 232 or an external memory 234. The internal memory 232 may include at least one of a volatile memory (E.g., dynamic random-access memory (DRAM), static RAM (SRAM), or synchronous dynamic RAM (SDRAM), etc.), a non-volatile memory (e.g., one-time programmable ROM (OTPROM), programmable ROM (PROM), erasable and programmable ROM (EPROM), electrically erasable and programmable ROM (EEPROM), mask ROM, flash ROM, a flash memory (e.g., a NAND flash or a NOR flash), a hard disk drive (HDD), or a solid state drive (SSD)).

The external memory 234 may further include a flash drive, e.g., a compact flash (CF) card, a secure digital (SD) card, a micro secure digital (Micro-SD) card, a mini secure digital (Mini-SD) card, an extreme digital (xD) card, a multimedia card (MMC), or a memory stick.

The sensor module 240 may measure a physical quantity or detect an operating state of the electronic device 201 and transform measured or detected information into an electric signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, or an ultraviolet (UV) sensor 240M.

For example, the input device 250 may include a touch panel 252, a (digital) pen sensor 254, a key 256, or an ultrasonic input device 258.

The display 260 (e.g., the display 160) may include a panel 262, a hologram device 264, or a projector 266. The panel 262 may have a configuration similar to or same as that of the display 160 of FIG. 1. For example, the panel 262 may be embodied to be flexible, transparent, or wearable. The panel 262 may be integrated with the touch panel 252 into a single module.

For example, the interface 270 may include a high-definition multimedia interface (HDMI) 272, a universal serial bus (USB) 274, an optical interface 276, or a D-sub-miniature (D-sub) 278.

For example, the audio module 280 may bilaterally transform a sound and an electric signal. At least some of the components of the audio module 280 may be included in the input/output interface 150 shown in FIG. 1, for example. The audio module 280 may process sound data input or output via a speaker 282, a receiver 284, earphones 286, or a microphone 288, for example.

For example, the camera module 291 is a device capable of capturing a still image and a moving picture. According to an embodiment, the camera module 291 may include one or more image sensors (e.g., a front image sensor and a back image sensor), a lens, an image signal processor (ISP), or a flash (e.g., a LED, a xenon lamp, etc.). The camera module 291 or the at least one processor 210 may control the flash to emit light. Detailed description thereof will be given below with reference to FIG. 3.

For example, the power managing module 295 may manage power of the photographing device 201.

The indicator 297 may indicate a particular state of the photographing device 201 or a part thereof (e.g., the 210), e.g., a booting state, a message state, or a charging state. The motor 298 may transform an electric signal into a mechanical vibration and may generate a vibration or a haptic effect.

Figure 3:
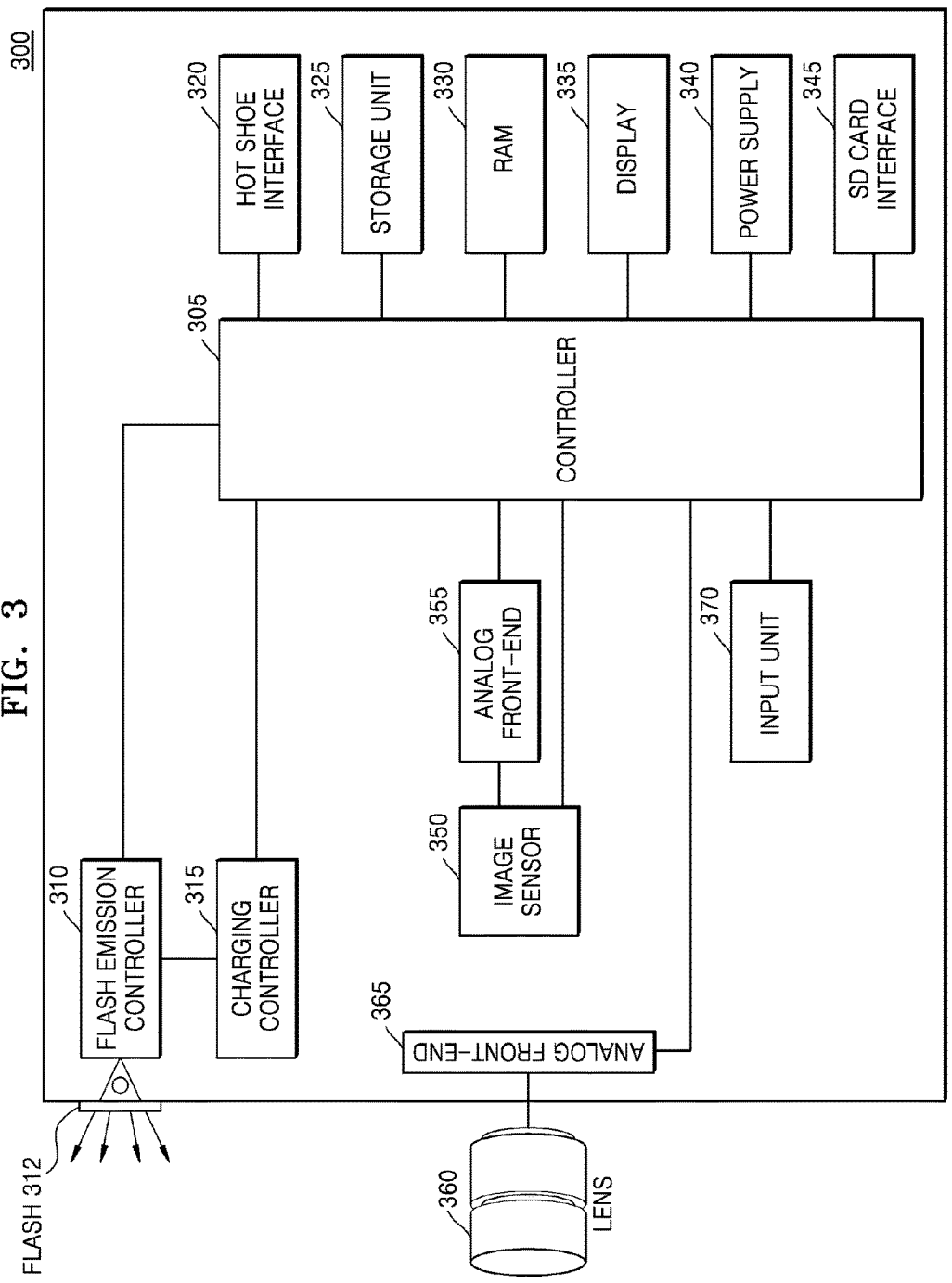
FIG. 3 is a block diagram illustrating an electronic device including a photographing device and a flash, according to an embodiment.

FIG. 3 is a block diagram of an electronic device including a photographing device and a flash, according to an embodiment.

Referring to FIG. 3, a photographing device 300 including a flash may include a controller 305, a flash emission controller 310, a flash 312, a charging controller 315, a hot shoe interface 320, a storage unit 325, RAM 330, a display 335, a power supply 340, an SD card interface 345, an image sensor 350, an analog front-end 355, a lens 360, a lens mount interface 365, and an input unit 370. Furthermore, the photographing device 300 of FIG. 3 may be included in the camera module 291 of FIG. 2.

The controller 305 may control a plurality of tasks of the photographing device 300. For example, the controller 305 may be a digital signal processor (DSP). The controller 305 may obtain light emission waveform data including light emission time and light emission intensity of a flash corresponding to a plurality of pre-set guide numbers. Light emission waveform data corresponding to a plurality of pre-set guide numbers will be described below with reference to FIG. 6.

Furthermore, the controller 305 may obtain light emission waveform data stored in the storage unit 325. Furthermore, the controller 305 may calculate a necessary light emission amount of light emission via a pre-flash. Pre-flash may be performed in order to calculate a necessary intensity of light emission for the photographing device 300 to photograph an object. A necessary light emission amount may include the intensity of light to be emitted by the flash emission controller 310 to supplement insufficient light emission amount when the photographing device 300 photographs an object. For example, the controller 305 may determine a necessary light emission amount based on a result of measuring light emission amount after the flash emission controller 310 emits light of intensity corresponding to a temporary guide number 1. Next, the controller 305 may set a guide number 3 corresponding to the necessary light emission amount as the main guide number of the flash emission controller 310.

The controller 305 may calculate a waveform area of light emission waveform data. The controller 305 may calculate an area between a graph, in which the y-axis indicates light emission intensity and the x-axis indicates light emission time, and the x-axis by using light emission waveform data, thereby calculating a waveform area of the light emission waveform data. The controller 305 may calculate respective light emission amounts regarding a plurality of guide numbers by using the waveform area.

The controller 305 may calculate a main guide number corresponding to light emission amount that satisfies necessary light emission amount from among light emission amounts. For example, when a calculated light emission amount is identical to or greater than a necessary light emission amount, the controller 305 may determine that the calculated light emission amount satisfies the necessary light emission amount. Therefore, the controller 305 may calculate a main guide number corresponding to the light emission amount that satisfied the necessary light emission amount. For example, when a guide number corresponding to necessary light emission amount of a flash is 10, the main guide number may be set to 10.

The flash emission controller 310 may control the flash 312 to emit light according to a light emission time and 1 corresponding to the calculated main guide number. For example, when a calculated guide number is 10, the flash emission controller 310 may control the flash 312 to emit light according to a light emission time and light emission intensity corresponding to the guide number 10.

The controller 305 may use differences between light emission waveform data corresponding to a plurality of guide numbers to calculate light emission waveform data corresponding to guide numbers other than the plurality of guide numbers. For example, light emission waveform data may include light emission waveform data corresponding to a few guide numbers. Here, the controller 305 may calculate light emission waveform data corresponding to a guide number between two guide numbers. In other words, the controller 305 may use light emission waveform data corresponding to a guide number 2 and light emission waveform data corresponding to a guide number 10 to calculate light emission waveform data corresponding to a guide number 6. The controller 305 may calculate light emission amounts corresponding to guide numbers other than the plurality of guide numbers by using the waveform area of light emission waveform data. The controller 305 may calculate a shutter speed and an aperture value and calculate an exposure time by using the calculated shutter speed and the calculated aperture value. For example, the controller 305 may pre-flash and determine a state of an object from light reflected by the object. Next, the controller 305 may calculate a shutter speed suitable for the determined state of the object. Furthermore, the controller 305 may calculate an aperture value suitable for the determined state of the object. The controller 305 may calculate an exposure time by using the calculated shutter speed and the calculated aperture value.

When an exposure time is shorter than a light emission time of a calculated main guide number, the controller 305 may calculate a light emission amount corresponding to the exposure time. The controller 305 may re-calculate a main guide number corresponding to light emission amount corresponding to the calculated exposure time. For example, when an exposure time is shorter than a light emission time of a flash, stronger light emission for a shorter time period is necessary, and thus a guide number larger than the guide number calculated by the controller 305 may be re-calculated as the main guide number. The flash emission controller 310 may emit light according to a light emission time and light emission intensity corresponding to the re-calculated main guide number. When the calculated exposure time is shorter than the light emission time of a flash, the flash emission controller 310 may reduce a shutter speed.

The charging controller 315 may determine a flash charging ratio. A flash may not be completely charged and momentary light emission amount may be weaker than that of a fully-charge state. In this case, when the light emission waveform is different from that of a fully-charged state, it is necessary for the charging controller 315 to determine a flash charging ratio.

The controller 305 may obtain different light emission waveform data according to charging ratios of a flash. Based on a determined flash charging ratio, the controller 305 may calculate an area of light emission waveform data by using different light emission waveform data according to charging ratios of a flash and the determined flash charging ratio. The storage unit 325 may store different light emission waveform data according to charging ratios of a flash. For example, regarding a same guide number, the storage unit 325 may store light emission waveform data regarding light emission intensity and a light emission time when the flash charging ratio is 100% and light emission waveform data regarding light emission intensity and a light emission time when the flash charging ratio is 80%. Furthermore, the controller 305 may obtain the different light emission waveform data according to charging ratios of a flash stored in the storage unit 325. Furthermore, the flash emission controller 310 may control a flash to emit light for different light emission times according to charging ratios determined by the controller 305.

According to an embodiment, the controller 305 may include at least one of the flash emission controller 310 and the charging controller 315, may control the other components of the photographing device 300, and perform tasks performed by the above-stated components.

The display 335 may display a calculated guide number, a flash distance based on a light emission corresponding to the calculated guide number, and light emission amount corresponding to the calculated guide number. Furthermore, the display 335 may display ISO sensitivity.

The hot shoe interface 320 is an extension terminal for connecting an external flash or a viewfinder to the photographing device 300. For example, when light emission amount of a flash included in a camera is insufficient, an external flash may be connected to the hot shoe interface 320. Furthermore, in the case of photographing under strong daylight or at night, an external viewfinder may be connected to the hot shoe interface 320 for increased precision.

The storage unit 325 may store an image captured by the photographing device 300. Furthermore, the storage unit 325 may store light emission waveform data including light emission times and light emission intensities of a flash corresponding to a plurality of pre-set guide numbers.

The RAM 330 refers to a memory device where data or a program may be written to, read out from, and erased from. A result of calculations performed by the controller 305 may be temporarily stored in the RAM 330 or the result may be used for a next calculation. Accordingly, a calculation speed of the controller 305 may be increased. However, when no power is supplied to the RAM 330 from the power supply 340, data in the RAM 330 is erased, and thus the RAM 330 is unable to permanently store data.

The power supply 340 may supply power to the photographing device 300 in order to operate the photographing device 300. The power supply 340 may supply power to the photographing device 300 by using a rechargeable battery, a disposable battery, or an AC voltage.

The SD card interface 345 is an extension terminal for connecting an SD card to the photographing device 300. An SD card is a flash memory card generally used in mobile electronic devices. In the case of storing images or data larger than the capacity of the storage unit 325 of the photographing device 300, an SD card may be connected to the SD card interface 345 and used as another storage unit.

The image sensor 350 refers to a sensor that detects information regarding an object and transforms the information into an electric image signal. In other words, the image sensor 350 is a semiconductor that transforms light incident via the lens 360 into a digital signal and displays the digital signal as an image.

The analog front-end 355 refers to a CP that is associated with a main processor and not only controls communication control, but also processes messages. For example, the analog front-end 355 may perform a pre-processing task with regard to the image sensor 350 in order to reduce load of the controller 305.

The lens 360 focuses or scatters light and is used to transmit light reflected by an object to the image sensor 350. A lens exchangeable photographing device may use various types of lenses. For example, types of lenses may include a wide angle lens, a single focus lens, a telephoto lens, or a macro lens.

The lens mount interface 365 is an extension terminal for mechanical and electrical connection between the photographing device 300 and the lens 360. The lens mount interface 365 is employed by a lens exchangeable photographing device.

The input unit 370 is a component for operating the photographing device 300 as desired by a user. For example, the input unit 370 may include a key, a button, etc. Furthermore, the input unit 370 may be a touch pad.

Figure 4:
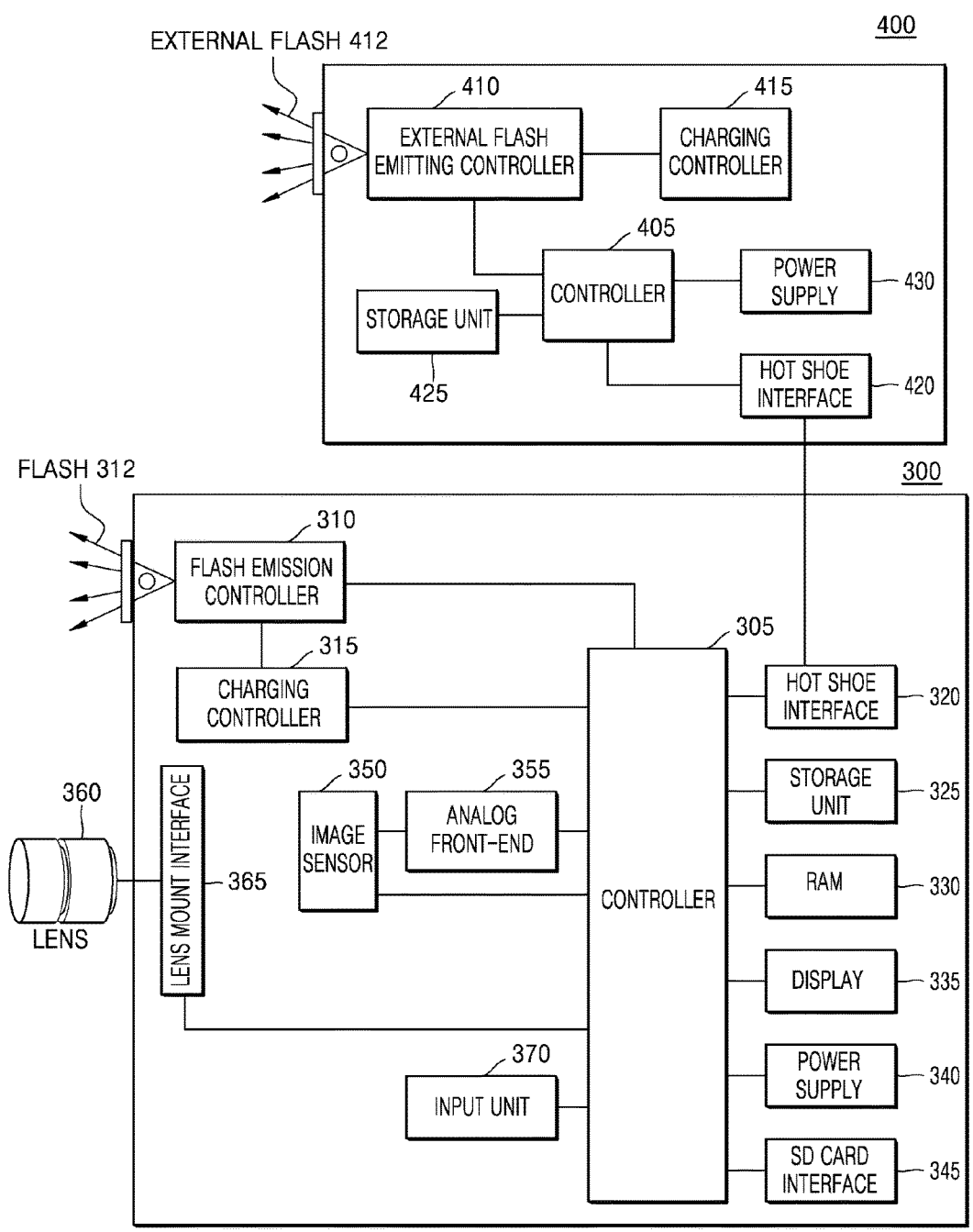
FIG. 4 is a block diagram illustrating an electronic device including a photographing device and a flash, according to another embodiment.

FIG. 4 is a block diagram of the photographing device 300 including a flash according to another embodiment.

Referring to FIG. 4, the photographing device 300 including a flash may include the controller 305, the flash emission controller 310, the charging controller 315, a hot shoe interface 320, a storage unit 325, RAM 330, a display 335, a power supply 340, an SD card interface 345, an image sensor 350, an analog front-end 355, a lens 360, a lens mount interface 365, an input unit 370, and an external flash controller 400. The external flash controller 400 may include a controller 405, an external flash emitting controller 410, an external flash 412, a charging controller 415, a hot shoe interface 420, a storage unit 425, and a power supply 430.

The photographing device 300 including a flash shown in FIG. 4 may include functions of the photographing device 300 including a flash described above with reference to FIG. 3.

The storage unit 425 may store light emission light emission times and light emission intensities regarding a flash corresponding to a plurality of pre-set guide numbers. The controller 305 may determine whether the external flash controller 400 is connected. When the controller 305 determines that the external flash controller 400 is connected, the controller 305 may obtain light emission light emission times and light emission intensities regarding a flash corresponding to a plurality of pre-set guide numbers from the storage unit 425 of the external flash controller 400.

Furthermore, the controller 405 may receive a calculated main guide number from the controller 305 of the photographing device 300 via the hot shoe interface 420. The external flash emitting controller 410 may control the external flash 412 to emit light according to a light emission time and light emission intensity corresponding to the received main guide number. The power supply 430 may provide power for operating the external flash controller 400. The power supply 430 may supply power by using a rechargeable battery or a disposable battery. The controller 405 may control the external flash controller 400 to emit light according to a light emission time and light emission intensity corresponding to the received main guide number. Furthermore, the flash emission controller 310, the flash 312, and the charging controller 315 described above with reference to FIG. 3 correspond to the external flash emitting controller 410, the external flash 412, and the charging controller 415 of FIG. 4, respectively, and thus the external flash emitting controller 410, the external flash 412, and the charging controller 415 may perform the same functions as the flash emission controller 310, the flash 312, and the charging controller 315. In other words, the flash 312 may be replaced with the external flash 412.

FIG. 5 is a table for describing a guide number.

A flash distance from a light source to an object is generally indicated by 'ft'. An aperture value (F value) may be obtained by dividing a flash distance by a guide number. A guide number of a flash may be expressed in a GV code. The table shown in FIG. 5 shows guide numbers according to shutter speeds in GV codes. The range of GVs may be from 28 to 187. GV stands for guide number value. Equation 1 below is an equation for calculating GV.

$$GV = 2\ \log_2(GN) * 16 \qquad \text{[Equation 1]}$$

Referring to FIG. 5, as GN increases, GV also increases. Furthermore, as the shutter speed (SS) increases from ½50 seconds to ½0000 seconds, the guide number decreases. For example, when the GV is 100, the guide number corresponding to the SS of ½12000 seconds is 6.73, but the guide number corresponding to the SS of ½20000 seconds is 4.86. In other words, the guide number decreases.

Referring to FIG. 5, when the SS is ½0000 seconds and a necessary guide number is 5.0, a necessary light emission may be obtained with a light emission corresponding to the guide number 9.72. Since the exposure time of the photographing device 300 is short, ISO sensitivity may be set high when a necessary guide number may not be obtained. Furthermore, when exposure parameters are in program auto mode or the SS is not fixed, the photographing device 300 may slightly reduce the SS to increase the aperture value (F value) and increase the guide number in order to obtain a necessary guide number.

FIG. 6 is a table for describing a method of controlling a photographing device including a flash according to an embodiment. FIG. 6 shows a table 600 showing a relationship between the GVs and light emission times in order to describe the graph shown in FIG. 7. In the table shown in FIG. 6, w0 through w5 indicate respective graphs. w0 indicates a graph showing a light emission waveform at the smallest GN. w1 indicates a graph having light emission intensity that is identical to light emission intensity corresponding to the largest guide number for a light emission time point t2 as the peak. In other words, the peak of w1 is light emission intensity identical to the light emission intensity 900, which is light emission intensity for the light emission time t2 in the graph corresponding to w5. w2 indicates a graph regarding the smallest guide number corresponding to light emission intensity that is identical to light emission intensity of a guide number, which corresponds to the highest light emission intensity for a light emission time point t3, for the light emission time point t3. In other words, w2 indicates a graph regarding the smallest guide number corresponding to light emission intensity of 1000 for the light emission time point t3. w3 indicates a graph in which a light emission time regarding the largest guide number is cut at a light emission time similar to a light emission time point t4. In other words, when the light emission time regarding the largest guide number is t4, since t4 is 6160 (μs*10), the light emission time thereafter is 6160 (μs*10). w4 indicates a graph in which the light emission time regarding the largest guide number is cut at a light emission time similar to a light emission time point t5. In other words, when the light emission time regarding the largest guide number is t5, since t5 is 22800 (μs*10), the light emission time thereafter is 22800 (μs*10). w5 indicates a graph of a light emission waveform of the largest guide number.

t0 through t6 denote light emission time. The unit of the light emission time is 'μs*10', which is a microsecond times 10. t0 denotes a light emission starting point. t1 denotes a light emission time at which a waveform starts. t2 denotes a light emission time at which the waveform is rising and a corresponding light emission intensity is 90% of the highest light emission intensity of the waveform. t3 denotes a light emission time corresponding to the highest light emission intensity. t4 denotes a light emission time at which the waveform is descending and a corresponding light emission intensity is 90% of the highest light emission intensity of the waveform. t4 denotes a light emission time at which the waveform is descending and a corresponding light emission intensity is 50%, of the highest light emission intensity of the waveform. t6 denotes a light emission time at which the waveform ends.

ht0 through ht6 denote light emission intensities corresponding to the light emission time points t0 through t6, respectively. Light emission intensity is indicated as a ratio when the largest value is 1000. For example, when light emission intensity is 50% of the largest value, the light emission intensity is indicated by 500. The largest light emission intensity for the lowest light emission is 352. In other words, the largest light emission intensity of the graph w0 is 352. The largest light emission intensity for the highest light emission is 1000.

Figure 7:
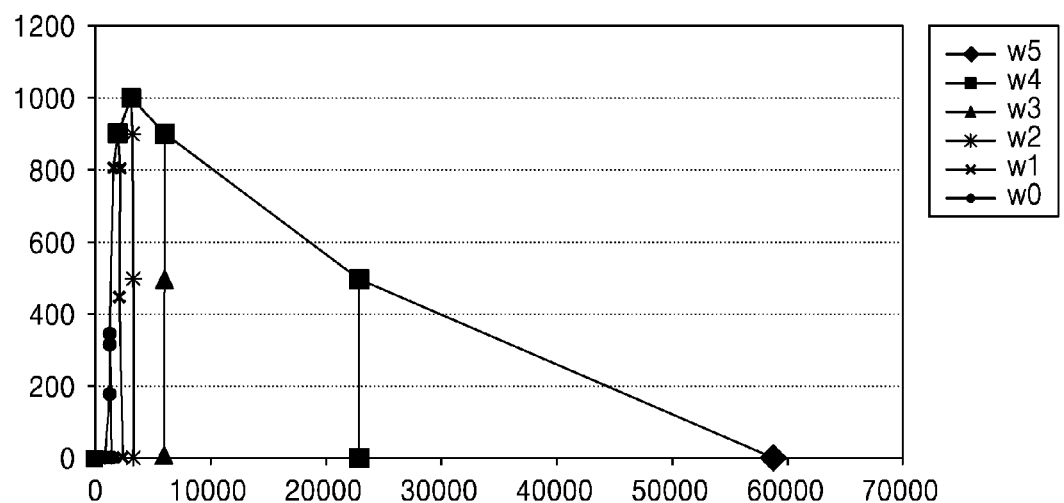
FIGS. 7 through 12 are graphs illustrating a method of controlling an electronic device including a photographing device and a flash, according to an embodiment.

FIGS. 7 through 12 are graphs for describing a method of controlling a photographing device including a flash, according to an embodiment. FIG. 7 is a graph corresponding to the table shown in FIG. 6. Referring to FIG. 7, the waveform changes as guide number changes. FIG. 7 shows that the guide number of a flash is controlled based on light emission time.

Figure 8:
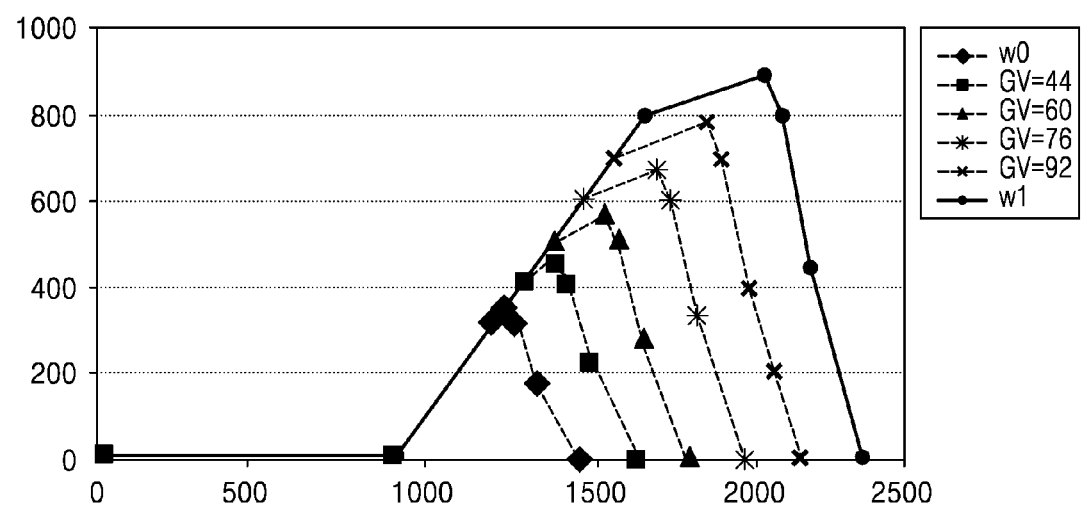

FIG. 8 is a graph showing that graphs corresponding to various guide numbers between the graph w0 and the graph w1 of FIG. 7 may be estimated. Here, the GV of the graph w0 is 28, whereas the GV of the graph w1 is 110. Therefore, since values between the two graphs increase proportionally, graphs corresponding to the GVs 44, 60, 76, and 92 may be estimated.

Figure 9:
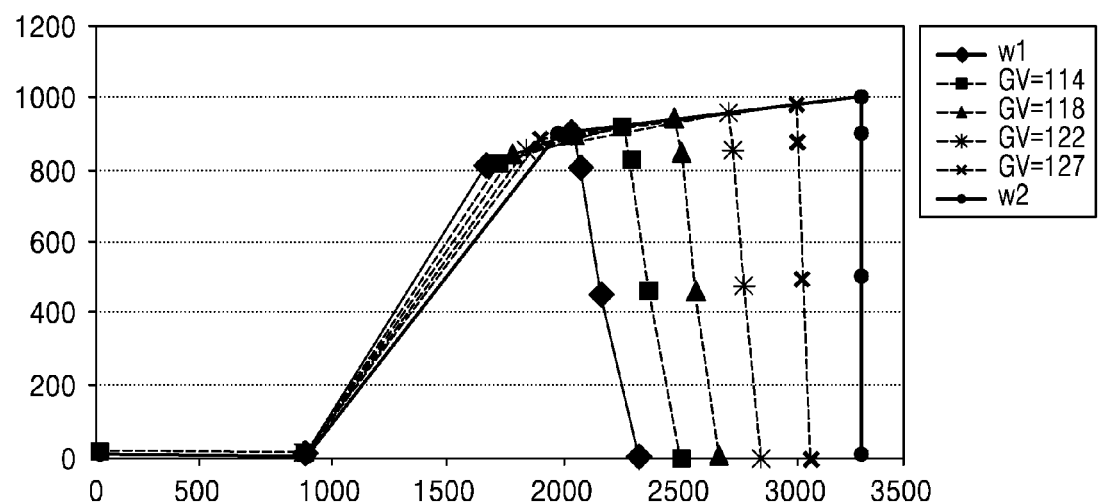

FIG. 9 is a graph showing that graphs corresponding to various guide numbers between the graph w1 and the graph w2 of FIG. 7 may be estimated. Here, the GV of the graph w1 is 110, whereas the GV of the graph w2 is 132. Therefore, since values between the two graphs increase proportionally, graphs corresponding to the GVs 114, 118, 122, and 127 may be estimated. Graphs corresponding to various guide numbers may be estimated by proportionally dividing line segments interconnecting points corresponding to light emission times of the graph w1 and the graph w2.

Figure 10:
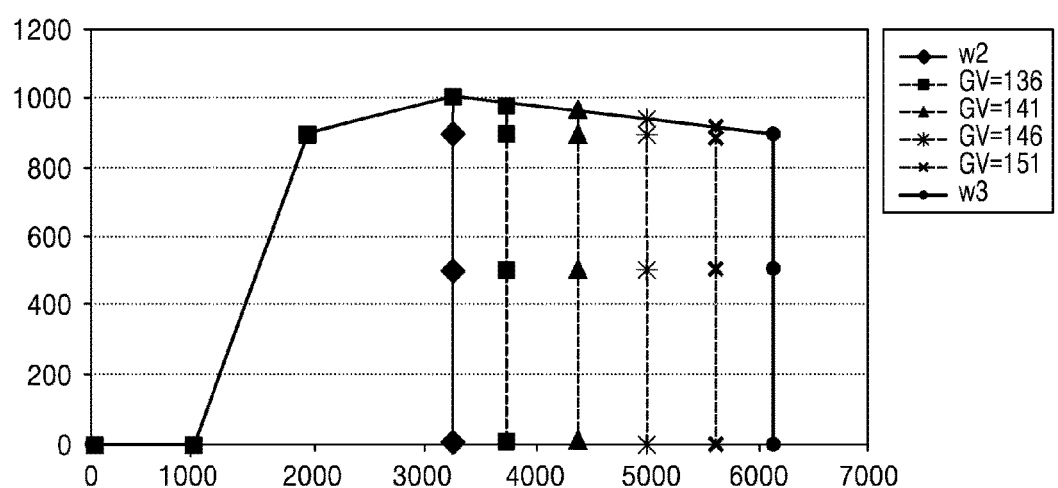

FIG. 10 is a graph showing that graphs corresponding to various guide numbers between the graph w2 and the graph w3 of FIG. 7 may be estimated. Here, the GV of the graph w2 is 132, whereas the GV of the graph w3 is 155. Therefore, since values between the two graphs increase proportionally, graphs corresponding to the GVs 136, 141, 146, and 151 may be estimated. Since the light emission time of the graph w2 is fixed at the light emission time point t3, graphs corresponding to various guide numbers may be estimated by using line segments interconnecting points corresponding to light emission intensities corresponding to the light emission time points t4 and t5 and points corresponding to light emission intensities of the graph w3.

Figure 11:
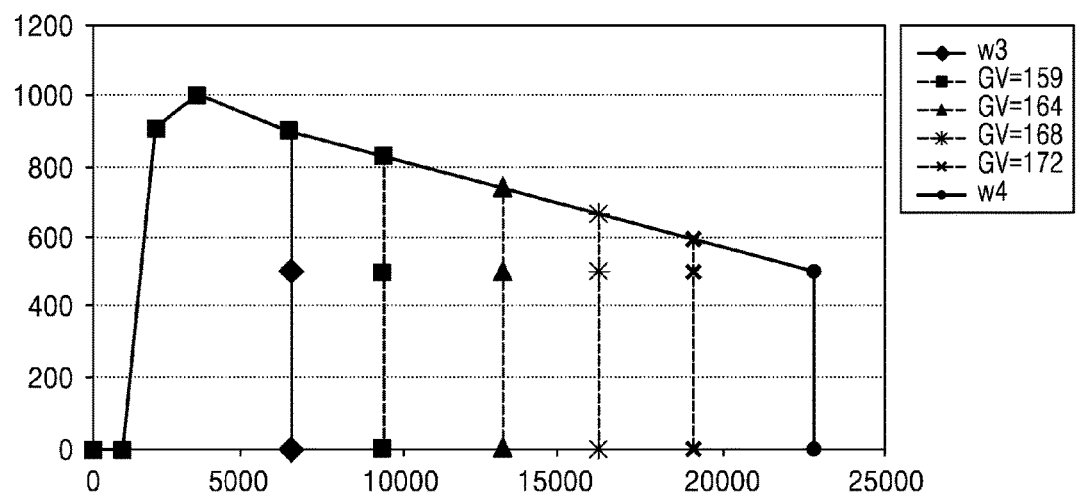

FIG. 11 is a graph showing that graphs corresponding to various guide numbers between the graph w3 and the graph w4 of FIG. 7 may be estimated. Here, the GV of the graph w3 is 155, whereas the GV of the graph w4 is 177. Therefore, since values between the two graphs increase proportionally, graphs corresponding to the GVs 159, 164, 168, and 172 may be estimated. Since the light emission time of the graph w3 is fixed at the light emission time point t4, graphs corresponding to various guide numbers may be estimated by using line segments interconnecting points corresponding to light emission intensities corresponding to the light emission time points t5 and t6 and points corresponding to light emission intensities of the graph w4.

Figure 12:
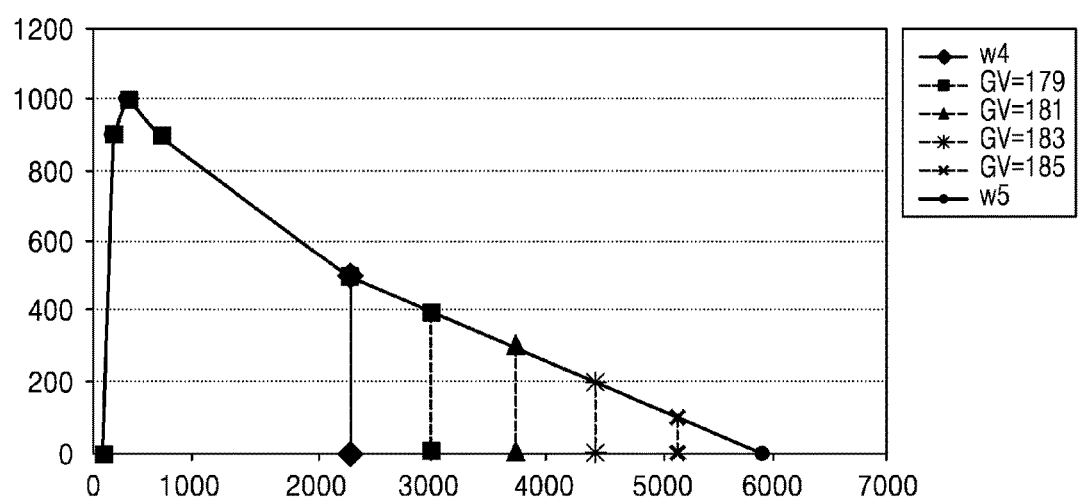

FIG. 12 is a graph showing that graphs corresponding to various guide numbers between the graph w4 and the graph w5 of FIG. 7 may be estimated. Here, the GV of the graph w4 is 177, whereas the GV of the graph w5 is 187. Therefore, since values between the two graphs increase proportionally, graphs corresponding to the GVs 179, 181, 183, and 185 may be estimated. The light emission time of the graph w4 is fixed at the light emission time point t5, and light emission intensity for the light emission time point t6 is 0. Therefore, since graphs corresponding to various guide numbers for the light emission time point t5 are identical to the graph w5, graphs of various guide numbers may be estimated.

FIGS. 13 through 16 are graphs for describing a method of controlling a photographing device including a flash, according to another embodiment. FIGS. 13 through 16 are diagrams for describing a method of calculating an area of a light emission waveform when an exposure time is shorter than a light emission time.

First, when an exposure time is shorter than a light emission time, a range corresponding to the largest waveform area may be set to the exposure time for improved efficiency. For example, descriptions will be given below in relation to a case where a range between a time point t2 and a time point t4 is longer than the exposure time. When the center of the exposure time is at a time point t3 and the starting point and the ending point of the exposure time are between the time points t2 and t4, the flash emits light at a light emission timing therebetween. However, when the center of the exposure time is at the time point t3 and the time point t2 is after the starting point of the exposure time, the flash emits light at a light emission timing that starts at the time point t2. When the center of the exposure time is at the time point t3 and the time point t4 is after the ending point of the exposure time, the flash emits light at a light emission timing that ends at the time point t4.

In another example, descriptions will be given below in relation to a case where a range between a time point t2 and a time point t4 is shorter than the exposure time. First, when a section between the light emission time point t1 and the light emission time point t6 is shorter than an exposure time, a light emission timing is determined to complete light emission within the exposure time.

In another example, when the center of an exposure time is identical to a time point (t2+t4)/2 and the light emission time point t1 is after the starting point of the exposure time, a light emission timing is determined, such that the exposure time starts at the time point t1. However, if the light emission time point t6 is located before the ending point of the exposure time, the light emission timing is determined, such that the exposure time ends at the time point t6.

According to the above-stated method, since exposure definitely occurs at the light emission time point t3, which is the peak of the light emission waveform, the exposure is highly efficient and, even if a difference between light emission states is significant, the exposure is little affected by the difference.

Furthermore, in another example, when a light emission time is longer than an exposure time, an exposure timing corresponding to the largest area may be used. When a section between the time point t2 and the time point t4 of the light emission waveform is longer than an exposure time, the starting time of the exposure time is set to the time point t3, an area of the light emission waveform is calculated by moving the exposure section until the ending point of the exposure time becomes the time point t3, and the starting point or the ending point of the exposure time is determined when the area becomes the largest.

On the other hand, a section between the time point t2 and the time point t4 of the light emission waveform is shorter than an exposure time, the starting time of the exposure time is set to the time point t2, an area of the light emission waveform is calculated by moving the exposure section until the ending point of the exposure time becomes the time point t4, and the starting point or the ending point of the exposure time is determined when the area becomes the largest.

Figure 13:
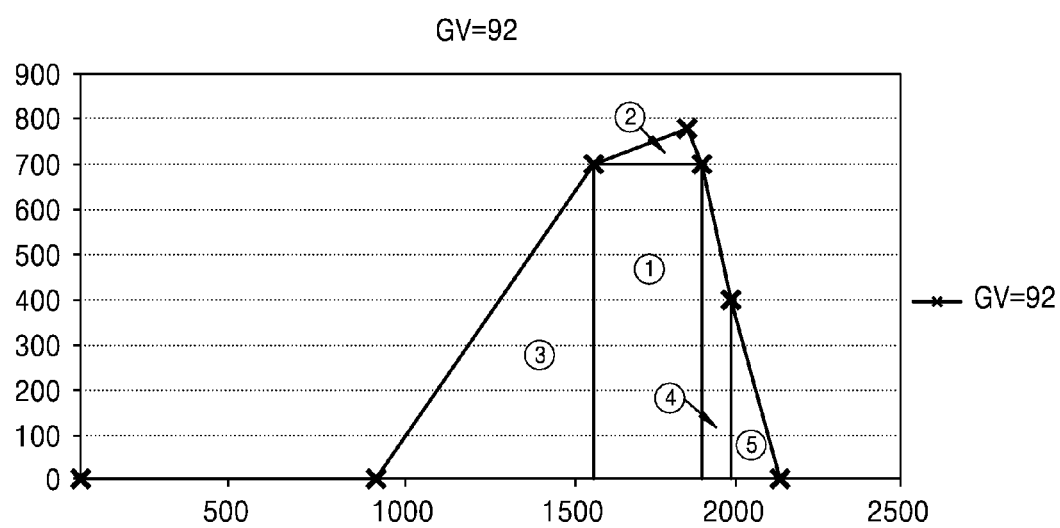
FIGS. 13 through 16 are graphs illustrating a method of controlling an electronic device including a photographing device and a flash, according to another embodiment.

Descriptions regarding FIGS. 13 through 16 will be given by using a waveform corresponding to the GV of 92. FIG. 13 is a diagram for describing a method of obtaining an area of an entire waveform when a light emission time is not shorter than an exposure time. The area of the entire light emission waveform may be a sum of areas of first through fifth geometric figures. The area of the first geometric figure may be obtained by calculating the area of the rectangle. The areas of the second, third, and fifth geometric figures may be obtained by calculating the areas of the triangles. The area of the fourth geometric figure may be obtained by calculating the area of the trapezoid.

Figure 14:
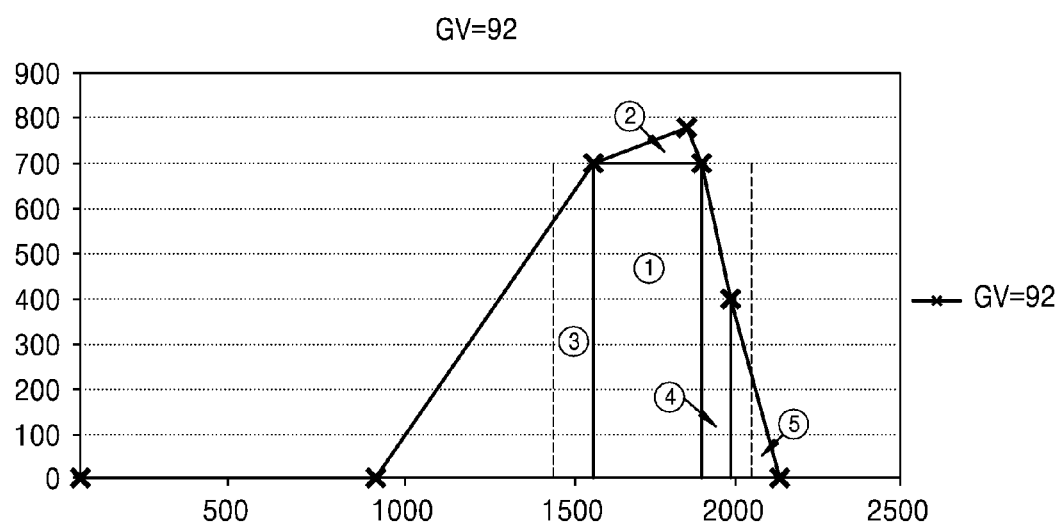

FIG. 14 is a diagram for describing a method of calculating an area of a light emission waveform during an exposure time when the photographing device 300 starts exposure at a time point between the light emission time point t1 and the light emission time point t2 and ends the exposure at a time point between the light emission time point t5 and the light emission time point t6. Here, the area of the light emission waveform may be a sum of areas of first through fifth geometric figures. The area of the first geometric figure may be obtained by calculating the area of the rectangle. The area of the second geometric figure may be obtained by calculating the area of the triangle. The areas of the third through fifth geometric figures may be obtained by calculating the areas of the trapezoids.

Figure 15:
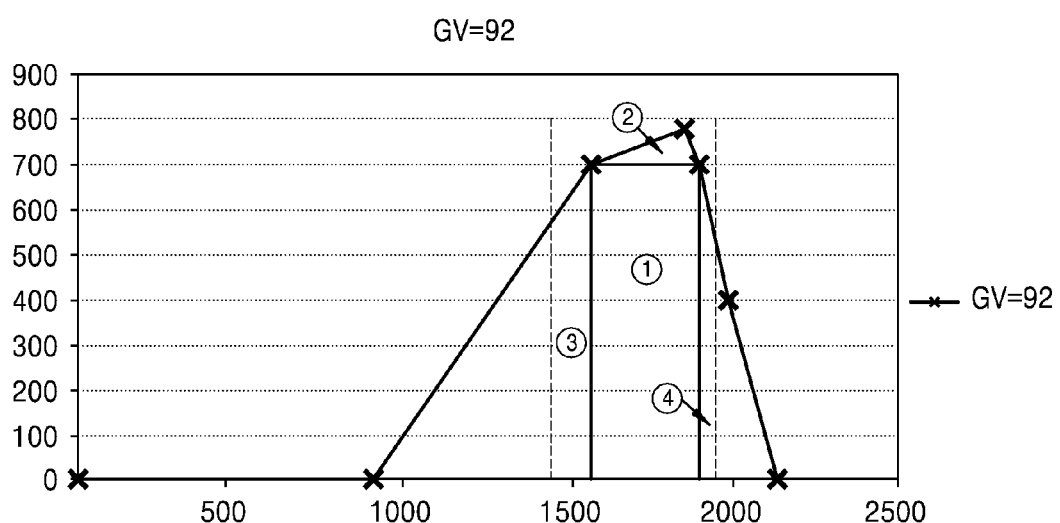

FIG. 15 is a diagram for describing a method of calculating an area of a light emission waveform during an exposure time when the photographing device 300 starts exposure at a time point between the light emission time point t1 and the light emission time point t2 and ends the exposure at a time point between the light emission time point t4 and the light emission time point t5. Here, the area of the light emission waveform may be a sum of areas of first through fourth geometric figures. The area of the first geometric figure may be obtained by calculating the area of the rectangle. The area of the second geometric figure may be obtained by calculating the area of the triangle. The areas of the third and fourth geometric figures may be obtained by calculating the areas of the trapezoids.

Figure 16:
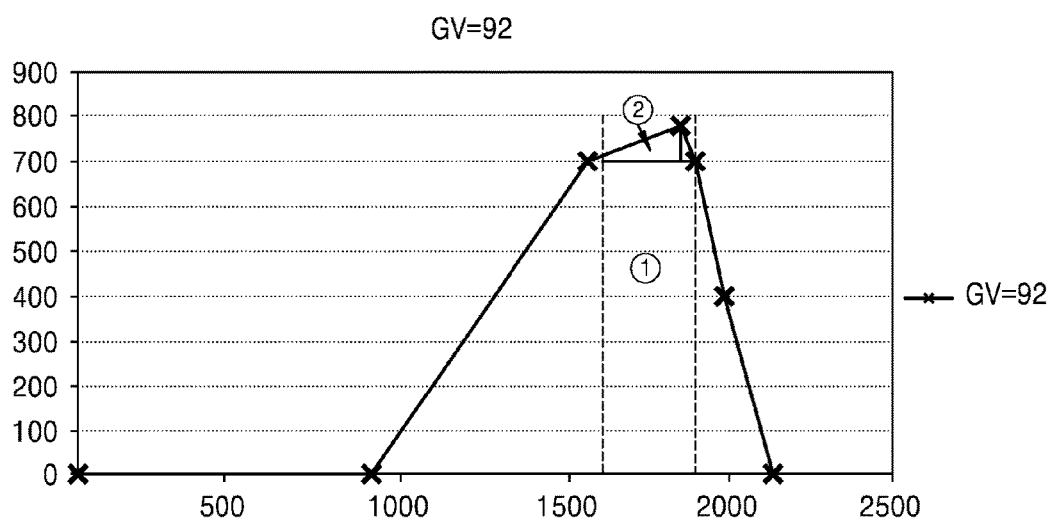

FIG. 16 is a diagram for describing a method of calculating an area of a light emission waveform during an exposure time when the photographing device 300 starts exposure at a time point between the light emission time point t2 and the light emission time point t3 and ends the exposure at a time point between the light emission time point t3 and the light emission time point t4. Here, the area of the light emission waveform may be a sum of areas of first and second geometric figure. The area of the first geometric figure may be obtained by calculating the area of the rectangle. The area of the second geometric figure may be obtained by calculating the areas of the two trapezoids. In the same regard, the method may also be applied to a case where the photographing device 300 starts exposure at a time point between the light emission time point t1 and the light emission time point t2 and ends the exposure at a time point between the light emission time point t3 and the light emission time point t4. Furthermore, the method may also be applied to a case where the photographing device 300 starts exposure at a time point between the light emission time point t2 and the light emission time point t3 and ends the exposure at a time point between the light emission time point t4 and the light emission time point t5. Furthermore, the method may also be applied to a case where the photographing device 300 starts exposure at a time point between the light emission time point t2 and the light emission time point t3 and ends the exposure at a time point between the light emission time point t5 and the light emission time point t6.

When an exposure time decreases, a guide number decreases. Therefore, when an exposure time becomes very short, an area of a light emission waveform becomes smaller than the light emission waveform corresponding to the smallest guide number, and thus there may be an area that does not exist in a graph between a GV and an area. In this case, the graph may be extended to a point at which the GV becomes 0 (that is, a point corresponding to the guide number 1) or an actually light emission amount may be measured.

Figure 17:
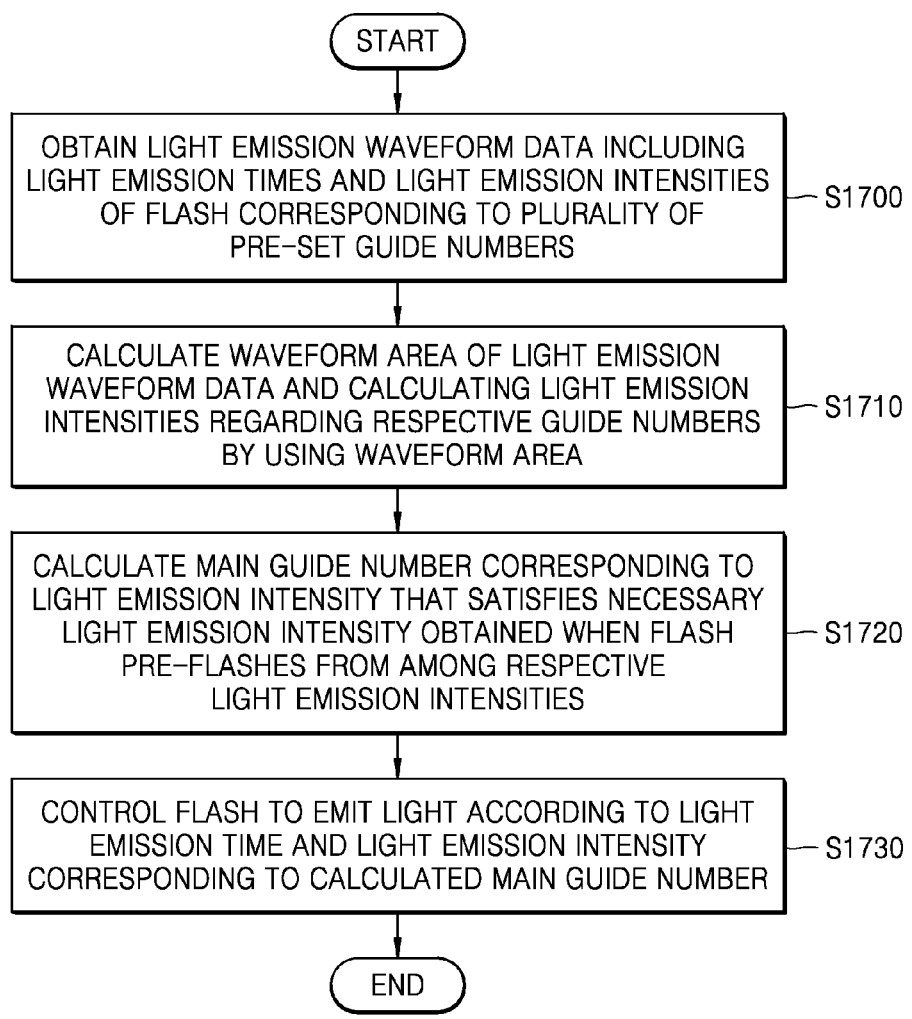
FIG. 17 is a flowchart illustrating a method of controlling an electronic device including a photographing device and a flash, according to an embodiment.

FIG. 17 is a flowchart for describing a method of controlling a photographing device including a flash, according to an embodiment.

In operation S1700, light emission light emission times and light emission intensities of the flash corresponding to a plurality of pre-set guide number may be obtained. Furthermore, it may be determined whether an external flash is connected. When it is determined that an external flash is connected, light emission light emission times and light emission intensities of the flash corresponding to a plurality of pre-set guide number may be obtained from the external flash. Meanwhile, a flash charging ratio may be determined. Furthermore, different light emission waveform data may be obtained according to charging ratios of the flash.

In operation S1710, an area of the light emission waveform data is calculated, and respective light emission amounts corresponding to a plurality of guide numbers may be calculated by using the waveform area. Furthermore, by using differences between light emission waveform data corresponding to a plurality of guide numbers, light emission waveform data corresponding to guide numbers other than the plurality of guide numbers may be calculated. Furthermore, by using the waveform area of the light emission waveform data, light emission amounts corresponding to the guide numbers other than the plurality of guide numbers may be calculated. Furthermore, the area of light emission waveform data may be calculated by using different light emission waveform data according to the determined flash charging ratio and the determined flash charging ratio.

In operation S1720, a main guide number corresponding to light emission amount that satisfies a necessary light emission amount obtained when a flash pre-flashes from among light emission amounts may be calculated. Furthermore, a shutter speed and an aperture value may be calculated. Next, an exposure time may be calculated by using the calculated shutter speed and the calculated aperture value. Furthermore, when the exposure time is shorter than a light emission time corresponding to the calculated main guide number, light emission amount corresponding to the exposure time may be calculated. Next, a main guide number corresponding to the calculated light emission amount corresponding to the exposure time may be re-calculated. Alternatively, when a calculated exposure time is shorter than a light emission time of a flash, a shutter speed may be reduced.

In operation S1730, a flash may be controlled to emit light according to a light emission time and light emission intensity corresponding to the calculated main guide number. Furthermore, an external flash may be controlled to emit light according to a light emission time and light emission intensity corresponding to the calculated main guide number. Furthermore, a flash may be controlled to emit light according to a light emission time and light emission intensity corresponding to the re-calculated main guide number. Furthermore, a calculated guide number, a flash distance based on a light emission corresponding to the calculated guide number, and light emission amount corresponding to the calculated guide number may be displayed.

Figure 18A:
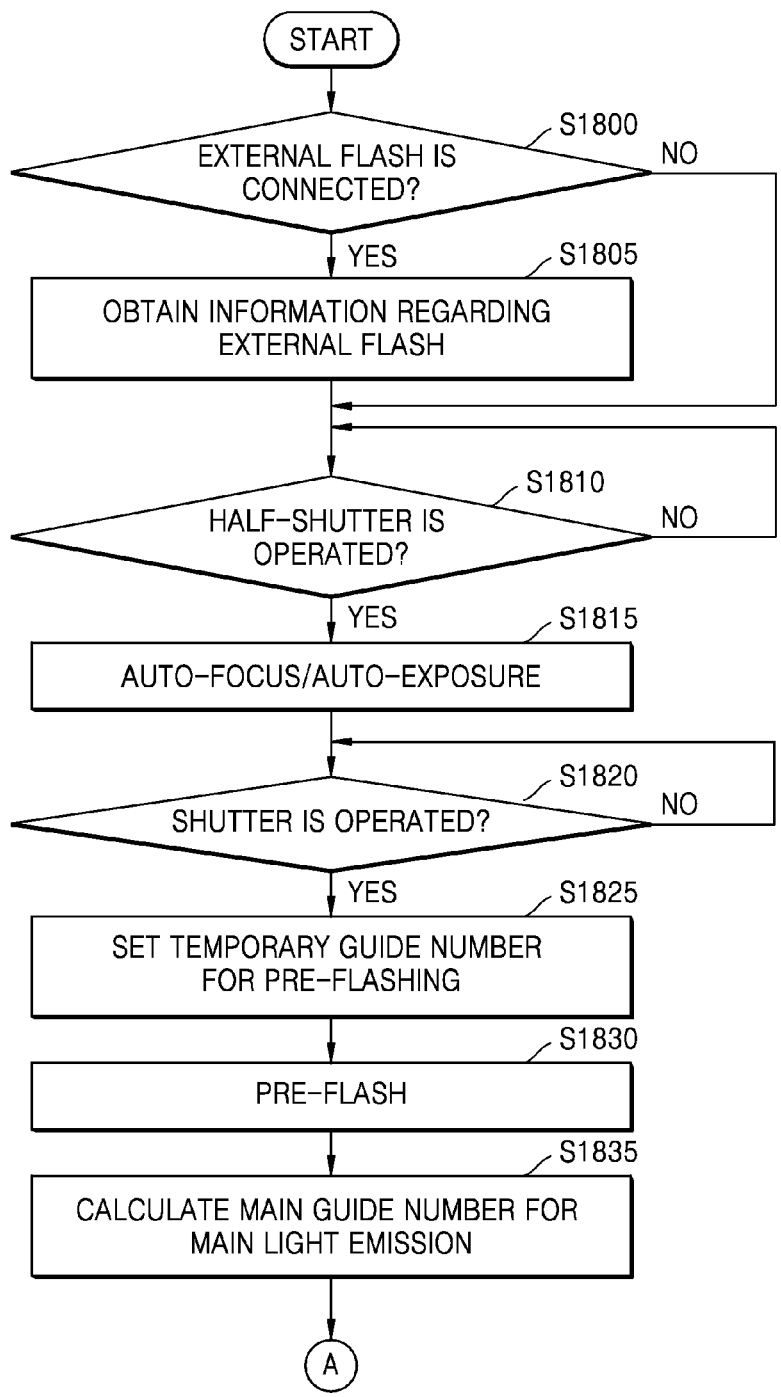
FIGS. 18A and 18B are flowcharts illustrating a method of controlling an electronic device including a photographing device and a flash, according to other embodiments.
Figure 18B:
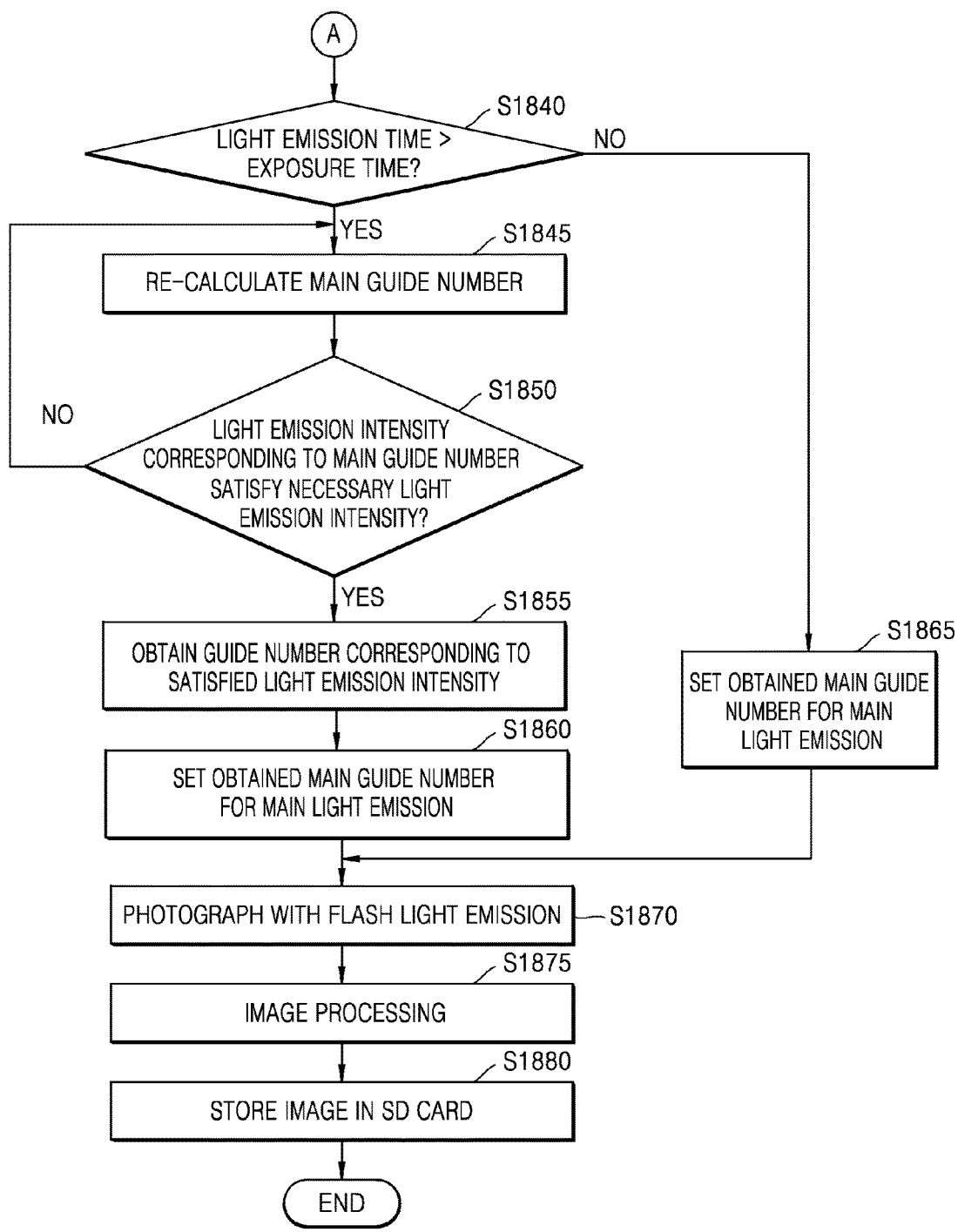

FIGS. 18A and 18B are flowcharts for describing a method of controlling a photographing device including a flash, according to other embodiments.

In operation S1800, it may be determined whether an external flash controller 400 is connected. When the external flash controller 400 is connected, the method may proceed to operation S1805 and information regarding the external flash controller 400 may be obtained. Here, guide number information regarding the external flash controller 400 may also be obtained. Furthermore, light emission waveform data regarding the external flash controller 400 stored in the external flash controller 400 may also be obtained. Furthermore, information regarding charging ratios of the external flash controller 400 may also be obtained.

After information regarding the external flash controller 400 is obtained in operation S1805, it may be determined whether to operate a half-shutter in operation S1810. When it is determined in operation S1800 that no external flash controller is connected, the method may directly proceed to operation S1810 and it may be determined whether to operate the half-shutter. When the half-shutter is not operated in operation S1810, it may be repeatedly determined whether to operate the half-shutter. When the half-shutter is operated in operation S1810, it may be determined whether to perform auto-focus or auto-exposure in operation S1815. The auto-focus refers to a function for automatically setting a focus on an object. An exposure refers to projection of light beams to an image sensor for capturing an image during a photographing operation. In order to precisely reproduce an image of an object, exposure may not be insufficient or excessive. An exposure is adjusted based on intensity of light transmitted via a lens, a lens aperture, and a shutter speed. An underexposure due to an insufficient light intensity or insufficient exposure time compared to a normal exposure regarding an object causes an overall dark image. On the contrary, excessive light emission amount or excessive exposure time causes an overexposure, which causes an image too bright. As a result, bright areas become white and eliminate details of an image. The auto-exposure refers to a function for automatically adjusting exposure for appropriately photographing an object.

Next, in operation S1820, it may be determined whether to operate a shutter. When the shutter is not operated in operation S1820, it may be repeatedly determined whether to operate the shutter. When the shutter is operated in operation S1820, a temporary guide number for pre-flashing a flash may be set in operation S1825. Next, the flash may be pre-flashed in operation S1830. Here, the flash may be an internal flash or an external flash. The pre-flashing is a temporary light emission of a flash in order to calculate a suitable flash light emission amount before the flash emits lights for actually photographing an object. Necessary flash light emission amount for photographing an object may be calculated based on information obtained via a pre-flashing.

Next, in operation S1835, a main guide number for main light emission of the flash may be calculated. Here, the main guide number may be calculated by using information obtained after the pre-flashing in operation S1830. For example, after necessary light emission amount is calculated via a pre-flashing, a guide number for main light emission may be calculated.

'A' after operation S1835 of FIG. 18A is connected to A of FIG. 18B. Therefore, operation S1840 of FIG. 18B follows operation S1835 of FIG. 18A.

In operation S1840, it may be determined whether an exposure time is shorter than a light emission time. When it is determined in operation S1840 that the exposure time is shorter than the light emission time, the main guide number may be re-calculated in operation S1845. Here, the main guide number may be re-calculated as a main guide number larger than a previously-calculated main guide number. For example, when a previously-calculated main guide number was 28, the main guide number may be re-calculated as 29. Next, it may be determined whether light emission amount corresponding to the main guide number satisfies necessary light emission amount. Here, when the light emission amount corresponding to the main guide number is identical to or greater than the necessary light emission amount, it may be considered that the necessary light emission amount is satisfied. When the necessary light emission amount is not satisfied, the method may proceed back to operation S1845 and the guide number may be re-calculated. When the necessary light emission amount is satisfied, the method may proceed to operation S1855 and a guide number corresponding to the satisfied light emission amount may be obtained. Next, in operation S1860, the obtained guide number may be set as a main guide number for main light emission of the flash. When the exposure time is not shorter than the light emission time in operation S1840, the method may directly proceed to operation S1865 and set the initially-calculated guide number as the main guide number for the main light emission of the flash.

Next, in operation S1870, the flash may emit light by using the set main guide number and an object may be photographed. Next, in operation S1875, a captured image may be image processed. Finally, in operation S1880, the processed image may be stored in an SD card. When a photographing device includes an internal memory, the processed image may also be stored in the internal memory.

The device described herein may comprise a processor, a memory for storing program data and executing it, a permanent storage unit such as a disk drive, a communications port for handling communication with external devices, and user interface devices, including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network coupled computer systems so that the computer-readable code is stored and executed in a distributed fashion. This media can be read by the computer, stored in the memory, and executed by the processor.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

Each of components of an electronic device described above according to the present disclosure may include one or more components, and each component's name may vary according to the type of the electronic device. The electronic device according to the present disclosure may include at least one of the above-described components, and some may be omitted or additional components may be included. Also, some of the components of the hardware according to the present disclosure may be combined into a single entity and perform functions identical to those of the respective components before their combination.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or language (e.g., "such as") provided herein, is intended merely to better illuminate the present disclosure and does not pose a limitation on the scope of the present disclosure unless otherwise claimed.

Although the present disclosure has been described with various exemplary embodiments, various changes and modifications may be suggested to one skilled in the art. It is intended that the present disclosure encompass such changes and modifications as fall within the scope of the appended claims.

What is claimed is:

1. A method of controlling an electronic device comprising a flash, the method comprising:
    obtaining light emission waveform data including light emission times and light emission intensities of the flash based on a plurality of pre-set guide numbers;
    determining a charging ratio of the flash;
    obtaining light emission waveform data that differs according to charging ratios of the flash;
    calculating a waveform area of the obtained light emission waveform data using the determined charging ratio of the flash and calculating respective light emission amounts based on the plurality of pre-set guide numbers by using the calculated waveform area;
    calculating a main guide number corresponding to a light emission amount that satisfies necessary light emission amount obtained when the flash pre-flashes from among the respective light emission amounts; and
    controlling the flash to emit light according to a light emission time and light emission intensity corresponding to the calculated main guide number.

2. The method of claim 1, wherein the calculating of the light emission amounts comprises:
    calculating, using differences between the light emission waveform data corresponding to the plurality of pre-set guide numbers, light emission waveform data corresponding to a second plurality of guide numbers other than the plurality of pre-set guide numbers; and
    calculating light emission amounts corresponding to the second plurality of guide numbers using the waveform area of the light emission waveform data.

3. The method of claim 1, wherein the obtaining of the light emission waveform data comprises:
    determining whether an external flash is connected; and,
    in response to a determination that the external flash is connected, obtaining light emission waveform data comprising light emission times and light emission intensities of the flash corresponding to a third plurality of pre-set guide numbers from the external flash.

4. The method of claim 3, wherein the controlling of the flash comprises controlling the external flash to emit light according to a light emission time and light emission intensity corresponding to the calculated main guide number.

5. The method of claim 1, further comprising:
calculating a shutter speed and an aperture value; and
calculating an exposure time by using the calculated shutter speed and the calculated aperture value.

6. The method of claim 5, wherein the calculating of the main guide number comprises:
calculating, in response to the exposure time being shorter than a light emission time corresponding to the calculated main guide number, a light emission amount corresponding to the exposure time; and
re-calculating a main guide number based on the light emission amount corresponding to the calculated exposure time,
wherein the flash is controlled to emit light according to a light emission time and light emission intensity corresponding to the re-calculated main guide number.

7. The method of claim 5, further comprising, in response to the calculated exposure time being shorter than the light emission time of the flash, reducing a shutter speed.

8. The method of claim 1, further comprising displaying the calculated guide number, a flash distance based on a light emission corresponding to the calculated guide number, and light emission amount corresponding to the calculated guide number.

9. An electronic device comprising:
a flash;
a flash emission controller configured to control a light emission time and light emission intensity of the flash; and
a controller configured to:
control the flash emission controller to obtain first light emission waveform data comprising light emission times and light emission intensities of the flash corresponding to a plurality of pre-set guide numbers;
determine a charging ratio of the flash;
obtain light emission waveform data that differs according to charging ratios of the flash;
calculate a waveform area of the first light emission waveform data obtained from the flash emission controller using the determined charging ratio of the flash;
calculate, using the waveform area, respective light emission amounts regarding the plurality of pre-set guide numbers;
calculate a main guide number corresponding to a main light emission amount from among the respective light emission amounts, the main light emission amount satisfying a necessary light emission amount obtained when the flash pre-flashes; and
provide the calculated main guide number to the flash emission controller.

10. The electronic device of claim 9, wherein the controller is configured to:
calculate, using differences between the light emission waveform data corresponding to the plurality of pre-set guide numbers, new light emission waveform data corresponding to a second plurality of guide numbers other than the plurality of pre-set guide numbers; and
calculate light emission amounts corresponding to the second plurality of guide numbers using waveform areas of the new light emission waveform data.

11. The electronic device of claim 9, wherein the controller is configured to:
determine whether an external flash is connected thereto, and
in response to a determination that the external flash is connected, obtain third light emission waveform data comprising third light emission times and third light emission intensities of the external flash corresponding to a third plurality of pre-set guide numbers from the external flash.

12. The electronic device of claim 11, wherein the controller is configured to control the external flash to emit light according to a light emission time and light emission intensity corresponding to the calculated main guide number.

13. The electronic device of claim 9, wherein the controller is configured to:
calculate a shutter speed and an aperture value, and
calculate an exposure time by using the calculated shutter speed and the calculated aperture value.

14. The electronic device of claim 13, wherein:
in response to the exposure time being shorter than a light emission time corresponding to the calculated main guide number, the controller is configured to calculate a light emission amount corresponding to the exposure time, and re-calculate a second main guide number corresponding to the light emission amount based on the calculated exposure time, and
the flash emission controller is configured to control the flash to emit light according to a light emission time and light emission intensity based on the re-calculated main guide number.

15. The electronic device of claim 13, wherein, in response to the calculated exposure time being shorter than the light emission time of the flash, the controller is configured to reduce a shutter speed.

16. The electronic device of claim 9, further comprising a display configured to display the calculated guide number, a flash distance based on a light emission corresponding to the calculated guide number, and light emission amount corresponding to the calculated guide number.

17. A non-transitory computer-readable recording medium having recorded thereon a computer program that, when executed by a processor, causes a method to be performed, the method including:
obtaining light emission waveform data including light emission times and light emission intensities of a flash based on a plurality of pre-set guide numbers;
determining a charging ratio of the flash;
obtaining light emission waveform data that differs according to charging ratios of the flash;
calculating a waveform area of the obtained light emission waveform data using the determined charging ratio of the flash and calculating respective light emission amounts based on the plurality of pre-set guide numbers by using the calculated waveform area;
calculating a main guide number corresponding to a light emission amount that satisfies necessary light emission amount obtained when the flash pre-flashes from among the respective light emission amounts; and
controlling the flash to emit light according to a light emission time and light emission intensity corresponding to the calculated main guide number.

* * * * *